(12) United States Patent
Devaraj et al.

(10) Patent No.: US 10,307,935 B2
(45) Date of Patent: Jun. 4, 2019

(54) SYSTEMS AND METHODS FOR PRODUCING CONSUMABLE POWDER

(71) Applicant: STRUCTURED POLYMERS, INC., Austin, TX (US)

(72) Inventors: Vikram Devaraj, Austin, TX (US); James K. Mikulak, Austin, TX (US); Carl R. Deckard, Austin, TX (US)

(73) Assignee: Structured Polymers, Inc., Austin, TX (US)

( * ) Notice: Subject to any disclaimer, the term of this patent is extended or adjusted under 35 U.S.C. 154(b) by 0 days.

(21) Appl. No.: 15/576,374

(22) PCT Filed: Dec. 21, 2016

(86) PCT No.: PCT/US2016/067911
§ 371 (c)(1),
(2) Date: Nov. 22, 2017

(87) PCT Pub. No.: WO2017/112723
PCT Pub. Date: Jun. 29, 2017

(65) Prior Publication Data
US 2018/0281232 A1 Oct. 4, 2018

Related U.S. Application Data

(60) Provisional application No. 62/271,116, filed on Dec. 22, 2015.

(51) Int. Cl.
| | |
|---|---|
| *B29B 9/12* | (2006.01) |
| *B29B 7/90* | (2006.01) |
| *B29B 9/06* | (2006.01) |
| *B29B 9/14* | (2006.01) |
| *B33Y 70/00* | (2015.01) |
| *B29B 7/88* | (2006.01) |
| *B29C 64/153* | (2017.01) |

(52) U.S. Cl.
CPC ............ *B29B 9/12* (2013.01); *B29B 7/88* (2013.01); *B29B 7/90* (2013.01); *B29B 9/06* (2013.01); *B29B 9/14* (2013.01); *B33Y 70/00* (2014.12); *B29C 64/153* (2017.08)

(58) Field of Classification Search
CPC .... B29B 9/12; B29B 7/88; B29B 7/90; B29B 9/06; B29B 9/14; B33Y 70/00; B29C 64/153
USPC ...................................................... 428/402
See application file for complete search history.

(56) References Cited

U.S. PATENT DOCUMENTS

| | | | |
|---|---|---|---|
| 4,247,508 A | 1/1981 | Housholder | |
| 4,500,706 A | 2/1985 | Mathis et al. | |
| 4,863,538 A | 9/1989 | Deckard | |
| 4,894,012 A | 1/1990 | Goldberg et al. | |
| 4,938,816 A | 7/1990 | Beaman et al. | |
| 4,944,817 A | 7/1990 | Bourell et al. | |
| 5,017,753 A | 5/1991 | Deckard | |
| 5,053,090 A | 10/1991 | Beaman et al. | |
| 5,076,869 A | 12/1991 | Bourell et al. | |
| 5,132,143 A | 7/1992 | Deckard | |
| 5,155,324 A | 10/1992 | Deckard et al. | |
| 5,296,062 A | 3/1994 | Bourell et al. | |
| 5,316,580 A | 5/1994 | Deckard | |
| 5,342,919 A | 8/1994 | Dickens, Jr. et al. | |
| 5,382,308 A | 1/1995 | Bourell et al. | |
| 5,387,380 A | 2/1995 | Cima et al. | |
| 5,518,680 A | 5/1996 | Cima et al. | |
| 5,527,877 A | 6/1996 | Dickens, Jr. et al. | |
| 5,597,589 A | 1/1997 | Deckard | |
| 5,616,294 A | 4/1997 | Deckard | |
| 5,639,070 A | 6/1997 | Deckard | |
| 5,648,450 A | 7/1997 | Dickens, Jr. et al. | |
| 5,733,497 A | 3/1998 | McAlea et al. | |
| 5,990,268 A | 11/1999 | Dickens, Jr. et al. | |
| 6,067,480 A | 5/2000 | Stuffle et al. | |
| 6,136,948 A | 10/2000 | Dickens, Jr. et al. | |
| 6,148,640 A | 11/2000 | Hendrickson et al. | |
| 6,245,281 B1 | 6/2001 | Scholten et al. | |
| 6,331,360 B1 | 12/2001 | Sugimoto et al. | |
| 6,335,095 B1 | 1/2002 | Sugimoto et al. | |
| 7,026,033 B2 | 4/2006 | Fujimori et al. | |
| 7,794,647 B1 | 9/2010 | Deckard | |
| 8,409,483 B2 | 4/2013 | Fruth | |

(Continued)

FOREIGN PATENT DOCUMENTS

| | | |
|---|---|---|
| CN | 103709737 A | 4/2014 |
| DE | 202011110084 U1 | 1/2013 |
| DE | 102013109160 A1 | 2/2015 |
| EP | 2175386 B1 | 12/2014 |
| JP | S62288011 A | 12/1987 |
| JP | H06285849 A | 10/1994 |
| JP | 2002265619 A | 9/2002 |
| JP | 2003192799 A | 7/2003 |
| JP | 2007162015 A | 6/2007 |
| JP | 2015180538 A | 10/2015 |

(Continued)

OTHER PUBLICATIONS

J.-P. Kruth et al., "Consolidation of Polymer Powders by Selective Laser Sintering," <<http://www.academia.edu/8286626/PMI08_Kruth_Levy_Keynote>>, downloaded Jul. 24, 2015, 16 pages.

(Continued)

*Primary Examiner* — Leszek B Kiliman
(74) *Attorney, Agent, or Firm* — Abel Schillinger, LLP

(57) ABSTRACT

A consumable polymeric based powder mixture may include a plurality of polymeric based particles that have a unitary construction. At least about 80% of the plurality of polymeric based particles may further have a generally cylindrical shape. The plurality of polymeric based particles may further have a particle length distribution span (PLDS) of not greater than about 1.2, where PLDS is equal to (L80−L20)/L50.

20 Claims, 7 Drawing Sheets

(56) References Cited

U.S. PATENT DOCUMENTS

| | | |
|---|---|---|
| 8,652,278 B2 | 2/2014 | Fruth et al. |
| 8,709,586 B2 | 4/2014 | Yano et al. |
| 8,801,990 B2 | 8/2014 | Mikulak et al. |
| 8,920,697 B2 | 12/2014 | Mikulak et al. |
| 9,487,443 B2 | 11/2016 | Watanabe |
| 9,694,542 B2 | 7/2017 | Sakura |
| 9,695,280 B2 | 7/2017 | Boydston et al. |
| 9,708,502 B2 | 7/2017 | Naruse et al. |
| 9,718,218 B2 | 8/2017 | Mikulak et al. |
| 9,782,935 B2 | 10/2017 | Yamashita et al. |
| 9,908,262 B2 | 3/2018 | Mikulak et al. |
| 9,919,475 B2 | 3/2018 | Sasaki |
| 9,960,714 B2 | 5/2018 | Kondoh et al. |
| 10,030,154 B2 | 7/2018 | Naruse et al. |
| 2002/0064745 A1 | 5/2002 | Schulman et al. |
| 2004/0131853 A1 | 7/2004 | Mushiake et al. |
| 2005/0080191 A1 | 4/2005 | Kramer et al. |
| 2006/0246287 A1 | 11/2006 | Gersch et al. |
| 2007/0241482 A1 | 10/2007 | Giller et al. |
| 2009/0139078 A1 | 6/2009 | Fruth et al. |
| 2010/0038807 A1 | 2/2010 | Brodkin et al. |
| 2011/0052927 A1 | 3/2011 | Martinoni et al. |
| 2011/0143108 A1 | 6/2011 | Fruth et al. |
| 2011/0156300 A1 | 6/2011 | Fruth |
| 2012/0225210 A1 | 9/2012 | Fruth |
| 2013/0060535 A1 | 3/2013 | Fruth |
| 2013/0209739 A1 | 8/2013 | Fruth |
| 2013/0224423 A1 | 8/2013 | Mikulak et al. |
| 2014/0050921 A1 | 2/2014 | Lyons et al. |
| 2014/0141166 A1* | 5/2014 | Rodgers .............. C08L 77/02 427/256 |
| 2014/0314964 A1* | 10/2014 | Ackelid ............... B05D 3/068 427/496 |
| 2015/0054200 A1 | 2/2015 | Fruth |
| 2015/0218360 A1* | 8/2015 | Barber ................. C08L 33/02 524/439 |
| 2015/0336292 A1* | 11/2015 | Mikulak ............... B29B 9/06 428/402 |
| 2016/0052058 A1 | 2/2016 | Bonke et al. |
| 2016/0052206 A1 | 2/2016 | Fruth |
| 2016/0236412 A1 | 8/2016 | Kusahara et al. |
| 2016/0271695 A1 | 9/2016 | Osaka et al. |
| 2016/0272844 A1 | 9/2016 | Osaka et al. |
| 2016/0280849 A1 | 9/2016 | Kamada et al. |
| 2017/0008228 A1 | 1/2017 | Iwata et al. |
| 2017/0113410 A1 | 4/2017 | Fruth |
| 2017/0113411 A1 | 4/2017 | Watanabe et al. |
| 2017/0173887 A1 | 6/2017 | Sasaki |
| 2017/0183519 A1 | 6/2017 | Morita et al. |
| 2017/0209927 A1 | 7/2017 | Yamashita et al. |
| 2017/0225404 A1 | 8/2017 | Naruse et al. |
| 2017/0239886 A1 | 8/2017 | Norikane |
| 2017/0270831 A1 | 9/2017 | Norikane et al. |
| 2017/0274652 A1 | 9/2017 | Tamai |
| 2017/0305036 A1 | 10/2017 | Mikulak et al. |
| 2018/0186034 A1 | 7/2018 | Mikulak et al. |

FOREIGN PATENT DOCUMENTS

| | | |
|---|---|---|
| KR | 20040101776 A | 12/2004 |
| WO | 03/035353 A1 | 5/2003 |
| WO | 2004113042 A2 | 12/2004 |
| WO | 2013090174 A1 | 6/2013 |
| WO | WO2013-090174 * | 6/2013 |
| WO | 2015009788 A1 | 1/2015 |
| WO | 2017112723 A1 | 6/2017 |

OTHER PUBLICATIONS

International Search Report and Written Opinion for PCT Application No. PCT/US2016/067911, dated Apr. 10, 2017, 10 pages.

* cited by examiner

SYSTEMS AND METHODS FOR PRODUCING CONSUMABLE POWDER

CROSS-REFERENCE TO RELATED APPLICATION(S)

This application is a national stage entry under 35 U.S.C. § 371 of International Application No. PCT/US2016/067911, filed Dec. 21, 2016, entitled "Systems and Methods for Producing Consumable Powder," by Vikram Devaraj et al., which claims priority to U.S. Provisional Patent Application No. 62/271,116, filed Dec. 22, 2015, entitled "Systems and Methods for Producing Consumable Powder," by Vikram Devaraj et al., both of which applications are assigned to the current assignee hereof and incorporated herein by reference in their entireties.

FIELD OF THE DISCLOSURE

The present disclosure relates to methods and systems for producing a consumable powder, and more particularly to, consumable powders for additive manufacturing systems, such as, Selective Laser Sintering (SLS), High Speed Sintering, and Selective Inhibition Sintering.

BACKGROUND

Additive manufacturing systems, such as Selective Laser Sintering (SLS), High Speed Sintering and Selective Inhibition Sintering, transform a consumable powder into a three dimensional article. The system builds the article from a digital representation in a layer-by-layer manner by selectively applying thermal energy to the consumable powder to fuse the powder particles into a monolithic part. Current techniques for manufacturing the consumable powders for such additive manufacturing systems include crushing or grinding large polymer pellets or precipitating polymer particles from a solution. However, these techniques are expensive and do not offer precise control of the particle morphology. Varying particle morphology in a consumable powder alters the melting time and temperature of the particles, which ultimately reduces the uniformity of the fusing process and weakens the monolithic part, formed using the additive manufacturing system. Accordingly, the industry continues to demand improved production techniques for consumable powders that show improved control of particle morphology.

SUMMARY

According to one aspect, a consumable polymeric based powder mixture may include a plurality of polymeric based particles having a unitary construction. Further, at least about 80% of the plurality of polymeric based particles may have a generally cylindrical shape.

According to yet another aspect, a consumable polymeric based powder mixture may include a plurality of polymeric based particles. Further, at least about 80% of the plurality of polymeric based particles may have a generally cylindrical shape and the plurality of polymeric based particles may have a particle length distribution span (PLDS) of not greater than about 1.2, where PLDS is equal to $(L_{80}-L_{20})/L_{50}$.

According to still another aspect, a method of forming a consumable polymeric based powder mixture may include providing a plurality of polymeric based tows that may include a plurality of polymeric based fibers, aggregating the plurality of polymeric based tows into an aggregated polymeric based tow and successively forming a plurality of polymeric based particles from the aggregated polymeric based tow. Further, the average length of the plurality of polymeric based particles may be less than about 250 microns.

According to yet another aspect, a method of forming a consumable polymeric based powder mixture may include providing a plurality of polymeric based tows that may include a plurality of polymeric based fibers, aggregating the plurality of polymeric based tows into an aggregated polymeric based tow and successively forming a plurality of polymeric based particles from the aggregated polymeric based tow. Further, at least a majority of the polymeric based particles of the plurality of polymeric based particles may have a unitary construction and at least about 80% of the plurality of polymeric based particles may have a generally cylindrical shape.

According to still another aspect, a method of forming a consumable polymeric based powder mixture may include providing a plurality of polymeric based tows that may include a plurality of polymeric based fibers, aggregating the plurality of polymeric based tows into an aggregated polymeric based tow and successively forming a plurality of polymeric based particles from the aggregated polymeric based tow. Further, at least about 80% of the plurality of polymeric based particles may have a generally cylindrical shape and the plurality of polymeric based particles may have a particle length distribution span (PLDS) of not greater than about 1.2, where PLDS is equal to $(L_{80}-L_{20})/L_{50}$.

According to still another aspect, a method of forming a consumable polymeric based powder mixture may include providing a plurality of polymeric based tows that may include a plurality of polymeric based fibers, aggregating the plurality of polymeric based tows into an aggregated polymeric based tow, successively forming a plurality of polymeric based particles from the aggregated polymeric based tow and wet processing the plurality of polymeric based particles. Further, at least about 80% of the plurality of polymeric based particles may have a generally cylindrical shape.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE PREFERRED EMBODIMENTS

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises." "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

The term "polymer" may refer to a homopolymer or a copolymer.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the relevant arts.

The present disclosure is directed to a consumable powder mixture and methods of forming and using a consumable powder mixture. The concepts are better understood in view of the embodiments described below that illustrate and do not limit the scope of the present disclosure.

Figure 1:
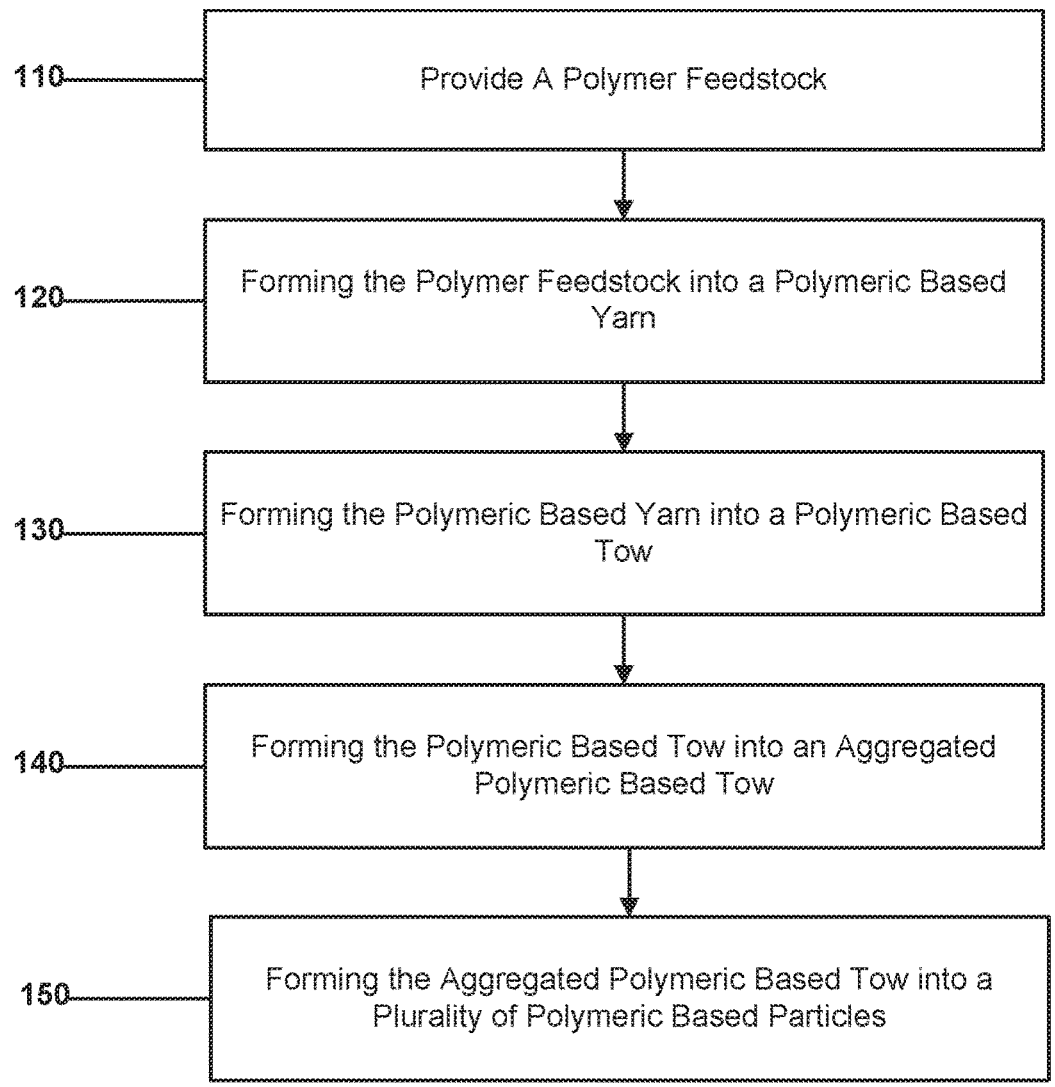
FIG. 1 includes an illustration of a flow diagram of a method according to one embodiment of the present disclosure.

Referring now to FIG. 1, one aspect of the present disclosure is directed to a method 100 of forming a consumable powder mixture. According to a particular embodiment described herein, the method may include a first step 110 of providing a polymer feedstock, a second step 120 of forming the polymer feedstock into a polymeric based yarn, a third step 130 of aggregating a plurality of polymeric based yarns into a tow, a fourth step 140 of aggregating a plurality of tows into an aggregated tow and a fifth step 150 of forming the aggregated polymeric based tow into a plurality of polymeric based particles, which make up at least a portion of the consumable powder mixture.

Referring first to step 110, the polymer feedstock provided is not limited in the broadest embodiments, and can incorporate any useful polymeric based material.

According to a particular embodiment, the polymer feedstock provided may include a semi-crystalline based polymer, such as, polyamides, polyethylenes, polypropylenes, polyetheretherketones, polyoxymethylene acetals, polytetrafluoroethylenes, polypheneylene sulfides, polybutylene terephthalates, block-copolymers thereof or combinations thereof. According to still other embodiments, the polymer feedstock provided may include aliphatic nylon polyamides, nylon 6, nylon 6-6, nylon 6-10, nylon 6-12, nylon 10, nylon 10-10, nylon 11, nylon 12, block-copolymers thereof or combinations thereof. According to yet another embodiment, the polymer feedstock provided may include a low-density polyethylene, medium-density polyethylene, high density polyethylene or combinations thereof.

According to a particular embodiment, the polymer feedstock provided may consist of a semi-crystalline based polymer, such as, polyamides, polyethylenes, polypropylenes, polyetheretherketones, polyoxymethylene acetals, polytetrafluoroethylenes, polypheneylene sulfides, polybutylene terephthalates, block-copolymers thereof or combinations thereof. According to still other embodiments, the polymer feedstock provided may consist of aliphatic nylon polyamides, nylon 6, nylon 6-6, nylon 6-10, nylon 6-12, nylon 10, nylon 10-10, nylon 11, nylon 12, block co-polymers thereof or combinations thereof. According to yet another embodiment, the polymer feedstock provided may consist of a low-density polyethylene, medium-density polyethylene, high density polyethylene, block copolymers thereof or combinations thereof.

According to yet other embodiments, the polymer feedstock provided may include an amorphous material base polymer, such as, poly(methyl methacrylate), polystyrene, acrylonitrile butadiene styrene, polylactic acid, polybenzimidazole, polycarbonate, polysulfone, amorphous polyamide, block copolymers thereof or combinations thereof.

According to yet other embodiments, the polymer feedstock provided may consist of an amorphous material base polymer, such as, poly(methyl methacrylate), polystyrene, acrylonitrile butadiene styrene, polylactic acid, polybenzimidazole, polycarbonate, polysulfone, amorphous polyamide, block copolymers thereof or combinations thereof.

Referring next to step 120, forming the polymer feedstock into a polymeric based yarn may include, for example, melting a polymer feedstock and then extruding and stretching the polymer feedstock to form a polymeric based fiber. According to a certain embodiment, a single polymeric based fiber may form the polymeric based yarn. According to still other embodiments, a plurality of polymeric based fibers may be aggregated to form a polymeric based yarn. Aggregating a plurality of polymeric based fibers may include any process of placing, collecting or combining the plurality of polymeric based fibers into a single group or cluster of polymeric based fibers to form the polymeric based yarn. According to yet other embodiments, aggregating the plurality of polymeric based fibers into a polymeric based yarn may include placing, collecting or combining the polymeric based fibers into a single group or cluster or polymeric based fibers with out twisting the plurality of polymeric based fibers. According to still other embodiments, aggregating the plurality of polymeric based fibers into a polymeric based yarn may include placing, collecting or combining the polymeric based fibers into a single group or cluster or polymeric based fibers by twisting the plurality of polymeric based fibers together to form the polymeric based yarn.

Referring next to step 130, forming a plurality of polymeric based yarns into a polymeric based tow may include aggregating the plurality of polymeric based yarns to form the polymeric based tow. Aggregating a plurality of polymeric based yarns may include any process of placing, collecting or combining the plurality of polymeric based yarns into a single group or cluster of polymeric based yarns to form the polymeric based tow. According to still other embodiments, aggregating the plurality of polymeric based yarns into a polymeric based tow may include placing, collecting or combining the polymeric based yarns into a single group or cluster or polymeric based yarns with out twisting the plurality of polymeric based yarns. According to still other embodiments, aggregating the plurality of polymeric based yarns into a polymeric based tow may include placing, collecting or combining the polymeric based yarns into a single group or cluster or polymeric based yarns by twisting the plurality of polymeric based yarns together to form the polymeric based tow.

Referring next to step 140, forming a plurality of polymeric based tows into an aggregated polymeric based tow may include aggregating the plurality of polymeric based tows to form the aggregated polymeric based tow. Aggregating a plurality of polymeric based tows may include any process of placing, collecting or combining the plurality of polymeric based tows into a single group or cluster of polymeric based tows to form the aggregated polymeric based tow. According to still other embodiments, aggregating the plurality of polymeric based tows into an aggregated polymeric based tow may include placing, collecting or combining the polymeric based tows into a single group or cluster or polymeric based tows with out twisting the plurality of polymeric based tows. According to still other embodiments, aggregating the plurality of polymeric based tows into an aggregated polymeric based tow may include placing, collecting or combining the polymeric based tows into a single group or cluster or polymeric based tows by twisting the plurality of polymeric based tows together to form the aggregated polymeric based tow.

Referring next to step 150, forming a consumable powder mixture from the aggregated polymeric based tow may include successively cutting the aggregated polymeric based tow to create a plurality of polymeric based particles. It will be appreciated that as the aggregated polymeric based tow is cut, it is the plurality of polymeric based fibers, which have been aggregated together to form polymeric based yarns, polymeric based tows and ultimately that aggregated polymeric based tow, that separate after being cut to create the plurality of polymeric based particles.

The aggregated polymeric based tow can be cut by, for example, one or more blades. In particular embodiments, the blades can act as a guillotine, where the aggregated polymeric based tow is cut generally perpendicular to the length of the aggregated polymeric based tow. In other embodiments, the aggregated polymeric based tow can be cut by any other useful method. For example, the aggregated polymeric based tow can be cut by laser, water jet, air jet, or any combination thereof.

It will be further appreciated that the aggregated polymeric based tow can be moved toward a cutting blade by, for example, a movable clamp. The clamp may compress the aggregated polymeric based tow and then move the aggregated polymeric based tow a predetermined length between cuts. In certain embodiments, the aggregated polymeric based tow can be compressed before and/or during cutting. Compression of the tows forming the aggregated polymeric based tow can reduce the space in between yarns and improve the cutting efficiency.

The distance the aggregated polymeric based tow moves in between cuts may be referred to herein as cutting intervals and may define the length of the particle. According to certain embodiments, successively cutting of the aggregated tows may be carried out at particular cutting intervals corresponding to a desired length of the plurality of polymeric based particles. According to certain embodiments, the cutting intervals can be the generally the same. According to still other embodiments, the cutting intervals can be different. In certain embodiments, the intervals can be generally the same for a desired number of cuts, and then can be changed to a different interval. In other embodiments, the intervals can vary throughout a cutting operation.

As described herein, particular embodiments involve combining a plurality of tows into an aggregated polymeric based tow and successively cutting the aggregated polymeric based tow to form a plurality of polymeric based particles. According to a particular embodiment, a consumable polymeric based powder mixture formed according to embodiments described herein may include the plurality of polymeric based particles. According to still other embodiments, the consumable polymeric based powder mixture formed according to embodiments described herein may consist of the plurality polymeric based particles. According to still other embodiments, the consumable polymeric based powder may include additives. According to still other embodiments, the consumable polymeric based powder may include fillers.

It will be appreciated that, according to certain embodiments, forming the polymer feedstock into the consumable polymeric based powder may be carried out using any combination of any of steps 120, 130, 140 or 150. It will also be appreciated that, according to certain embodiments, forming the polymer feedstock into the consumable polymeric based powder may be carried out using any combination of steps 120, 130, 140 or 150 in any desired order.

Figure 2A:
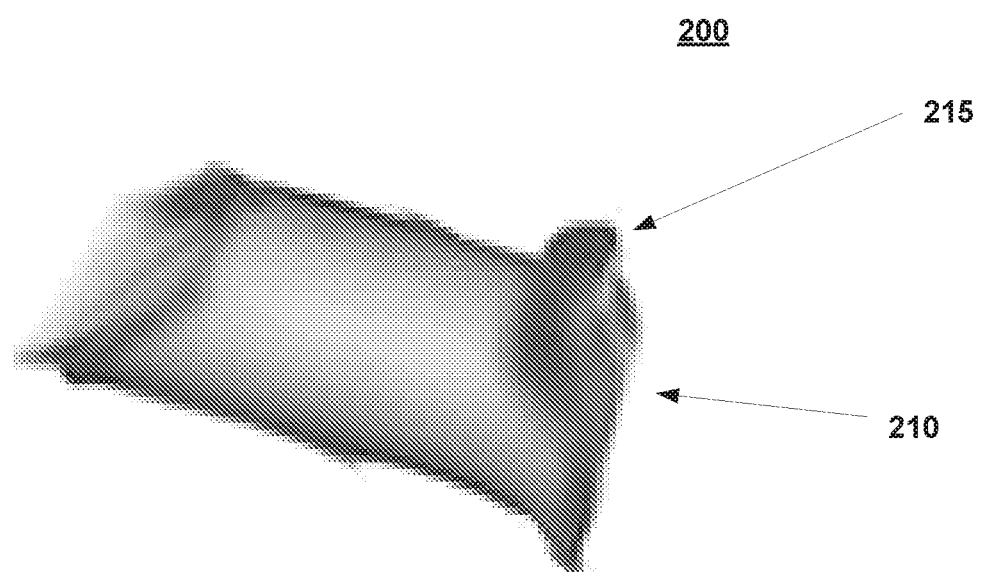
FIG. 2a includes an image of a polymeric based particle according to one embodiment of the present disclosure.
Figure 2B:
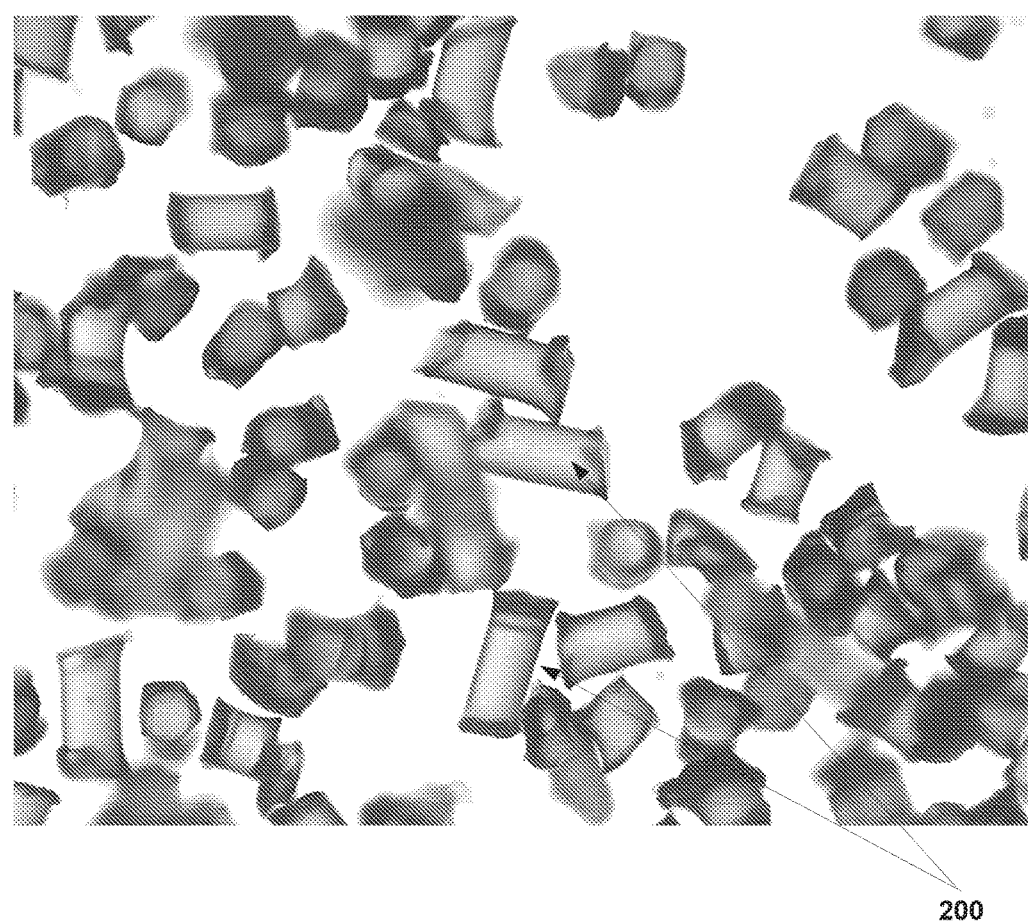
FIG. 2b includes an image of a plurality of polymeric based particles according to one embodiment of the present disclosure.

Referring now to the plurality of polymeric based particles formed according to embodiments described herein, FIG. 2a includes an image of a polymeric based particle 200. FIG. 2b includes an image of a plurality of polymeric based particles 200 formed according to embodiments described herein.

According to certain embodiments, polymeric based particles formed according to embodiments described herein may be described as have a non-unitary or a unitary construction.

According to certain embodiments, a polymeric based particle having a non-unitary construction may be described as including multiple structural components. According to certain embodiments, a polymeric based particle having a non-unitary construction may include any number of structural components. For example, a polymeric based particle having a non-unitary construction may include at least two structural components. According to still other embodiments, a polymeric based particle having a non-unitary construction may be described as including a layered construction. According to yet other embodiments, a polymeric based particle having a non-unitary construction may be described as including a core component and a shell component. The shell component may be distinct from the core component. The shell component may surround the core component.

According to yet another embodiment, a polymeric based particle having a non-unitary construction may include an "islands in the sea" construction. According to still another embodiment, a polymeric based particle having a non-unitary construction may include a "side by side—regular" construction. According to still another embodiment, a polymeric based particle having a non-unitary construction may include a "side by side—irregular" construction. According to still another embodiment, a polymeric based particle having a non-unitary construction may include a "hollow filament" construction. According to still another embodiment, a polymeric based particle having a non-unitary construction may include a "matrix/fibril" construction. According to still another embodiment, a polymeric based particle having a non-unitary construction may include any combination of the non-unitary constructions noted above.

According to still other embodiments, a polymeric based particle having a unitary construction may be described as including a single structural component. According to still other embodiments, a polymeric based particle having a unitary construction may be described particularly as not having a core component and a shell component distinct from the core component. According to still other embodiments, a polymeric based particle having a unitary construction may be described particularly as not having a layered construction.

According to still other embodiments, at least a majority of the polymeric particles formed according to embodiments described herein may have a unitary construction. It will also be appreciated that at least a majority of the polymeric based particles having a unitary construction may be taken to indicate that at least about 50% of the polymeric based particles have a unitary construction. According to still other embodiments, it will be appreciated that a greater percentage of the polymeric based particles may have a unitary instruction. For example, the percentage polymeric based particles having a unitary construction may be at least about 55%, such as, at least about 60%, at least about 65%, at least about 70%, at least about 75%, at least about 80%, at least about 85%, at least about 90% or even at least about 95%. It will be appreciated that the percentage of polymeric based particles having a unitary construction may be any value between any of values noted above. It will be further appreciated that the percentage of polymeric based particles having a unitary construction may be within a range between any of the values noted above.

According to yet another embodiment, a polymeric based particle may have a generally cylindrical shape. It will be appreciated that the cylindrical shape may be any three dimensional cut cylinder, for example, a right cylinder or an obliquely cut circular cylinder. It will be further appreciated that the cylindrical shape may have any two-dimensional shaped base. For example, the base of the cylindrical shape may be a polygon, a circle, an ellipse or a triangle.

According to still another embodiment, having a generally cylindrical shape may be defined as the polymeric based particle fitting within a best-fit cylindrical shape as described herein while occupying at least at least a majority of an interior volume of the best-fit cylindrical shape. For example, the polymeric based particle having a generally cylindrical shape may occupy at least about 75% of an interior volume of the best-fit cylindrical shape, at least about 80% of an interior volume of the best-fit cylindrical shape, at least about 85% of an interior volume of the best-fit cylindrical shape, at least about 90% of an interior volume of the best-fit cylindrical shape, at least about 92% an interior volume of the best-fit cylindrical shape, at least about 95% of an interior volume of the best-fit cylindrical shape, at least about 97% of an interior volume of the best-fit cylindrical shape or even at least about 99% of an interior volume of the best-fit cylindrical shape.

According to yet other embodiments, a particular percentage of the plurality of polymeric based particles may have a generally cylindrical shape as described herein. For example, at least about 80% of the plurality of polymeric based particles may have a generally cylindrical shape, such as, at least about 85% of the plurality of polymeric based particles may have a generally cylindrical shape, at least about 90% of the plurality of polymeric based particles may have a generally cylindrical shape or even at least about 95% of the plurality of polymeric based particles may have a generally cylindrical shape. It will be appreciated that the percentage of polymeric based particles having a generally cylindrical shape may be any value between any of the values noted above. It will be further appreciated that the percentage of polymeric based particles having a generally cylindrical shape may be within a range between any of the values noted above.

According to yet another embodiment, a polymeric based particle may have at least one internal cross-section orthogonal to the longitudinal axis of the generally cylindrical shape. According to still other embodiments a polymeric based particle may have at least two internal cross-sections having approximately the same area, both being orthogonal to the longitudinal axis of the generally cylindrical shape. According to still another embodiment, a polymeric based particle may have a generally planar face orthogonal to a longitudinal axis of the generally cylindrical shape of the polymeric based particle.

According to yet another embodiment, the polymeric based particles may be described as having a cut artifact. A cut artifact is a discrepancy in the generally cylindrical shaped of the polymeric based particles located on one or both of the two bases of the generally cylindrical shaped particles. It will be appreciated that the cut artifact is indicative of the polymeric based particles being formed using a cutting process. FIG. 2a further illustrates a polymeric based particle having a cut artifact 215 located on a base 210 of a polymeric based particle 200.

According to particle embodiments, a particular percentage of the polymeric based particles may have at least one cut artifact. For example, the percentage of polymeric based particles having a cut artifact may be at least about 80%, such as, at least about 85%, at least about 90% or even at least about 95%. It will be appreciated that the percentage of polymeric based particles having at least one cut artifact may be any value between any of the values noted above. It will be further appreciated that the percentage of polymeric based particles having a cut artifact may be within a range between any of the values noted above.

According to yet other embodiments, at least a majority of the polymeric based particles may be described has having a particular maximum length. For example, the maximum length of the majority of polymeric based particles may be not greater than about 250 microns, such as, not greater than about 240 microns, not greater than about 230 microns, not greater than about 220 microns, not greater than about 210 microns, not greater than about 200 microns, not greater than about 190 microns, not greater than about 180 microns, not greater than about 170 microns, not greater than about 160 microns or even not greater than about 150 microns. According to still other embodiments, the maximum length of the majority of polymeric based particles may be at least about 30 microns, such as, at least about 40 microns or even at least about 50 microns. It will be appreciated that the maximum length of the majority of polymeric based particles may be any value between any of the minimum and maximum values noted above. It will be further appreciated that the maximum length of the majority of polymeric based particles may be within a range between any of the minimum and maximum values noted above.

It will also be appreciated that at least a majority of the polymeric based particles having a particular maximum length may be taken to indicate that at least about 50% of the polymeric based particles have a particular maximum length as described herein. According to still other embodiments, it will be appreciated that a greater percentage of the polymeric based particles may have a particular maximum length as described herein. For example, the percentage polymeric based particles having a particular maximum length as described herein may be at least about 55%, such as, at least about 60%, at least about 65%, at least about 70%, at least about 75%, at least about 80%, at least about 85%, at least about 90% or even at least about 95%. It will be appreciated that the percentage of polymeric based particles having a particular maximum length as described herein may be any value between any of values noted above. It will be further appreciated that the percentage of polymeric based particles having a particular maximum length as described herein may be within a range between any of the values noted above.

According to yet other embodiments, at least a majority of the polymeric based particles may be described has having a particular average length. For example, the average length of the majority of polymeric based particles may be not greater than about 225 microns, such as, not greater than about 200 microns, not greater than about 175 microns, not greater than about 150 microns, not greater than about 125 microns, not greater than about 100 microns, not greater than about 90 microns, not greater than about 80 micron or even not greater than about 70 microns. According to still other embodiments, the average length of the majority of polymeric based particles may be at least about 15 microns, such as, at least about 20 microns, at least about 5 microns, at least about 30 microns, at least about 40 microns or even at least about 50 microns. It will be appreciated that the average length of the majority of polymeric based particles may be any value between any of the minimum and maximum values noted above. It will be further appreciated that the average length of the majority of polymeric based particles may be within a range between any of the minimum and maximum values noted above.

It will also be appreciated that at least a majority of the polymeric based particles having a particular average length may be taken to indicate that at least about 50% of the polymeric based particles have a particular average length as described herein. According to still other embodiments, it will be appreciated that a greater percentage of the polymeric based particles may have a particular average length as described herein. For example, the percentage polymeric based particles having a particular average length as described herein may be at least about 55%, such as, at least about 60%, at least about 65%, at least about 70%, at least about 75%, at least about 80%, at least about 85%, at least about 90% or even at least about 95%. It will be appreciated that the percentage of polymeric based particles having a particular average length as described herein may be any value between any of values noted above. It will be further appreciated that the percentage of polymeric based particles having a particular average length as described herein may be within a range between any of the values noted above.

According to yet other embodiments, at least a majority of the polymeric based particles may be described has having a particular maximum width. For example, the maximum width of the majority of the polymeric based particles may be not greater than about 100 microns, such as, not greater than about 90 microns, not greater than about 80 microns, not greater than about 70 microns, not greater than about 60 microns, not greater than about 50 microns, not greater than about 40 microns or even not greater than about 30 microns. According to still other embodiments, the maximum width of the majority of the polymeric based particles may be at least about 1 micron, such as, at least about 5 microns, at least about 10 microns or even at least about 15 microns. It will be appreciated that the maximum width of the majority of the polymeric based particles may be any value between any of the minimum and maximum values noted above. It will be further appreciated that the maximum width of the majority of polymeric based particles may be within a range between any of the minimum and maximum values noted above.

It will also be appreciated that at least a majority of the polymeric based particles having a particular maximum length may be taken to indicate that at least about 50% of the polymeric based particles have a particular maximum length as described herein. According to still other embodiments, it will be appreciated that a greater percentage of the polymeric based particles may have a particular maximum width as described herein. For example, the percentage polymeric based particles having a particular maximum width as described herein may be at least about 55%, such as, at least about 60%, at least about 65%, at least about 70%, at least about 75%, at least about 80%, at least about 85%, at least about 90% or even at least about 95%. It will be appreciated that the percentage of polymeric based particles having a particular maximum width as described herein may be any value between any of values noted above. It will be further appreciated that the percentage of polymeric based particles having a particular maximum width as described herein may be within a range between any of the values noted above.

According to yet other embodiments, at least a majority of the polymeric based particles may be described has having a particular length to width ratio L/W, where L is the maximum length of the polymeric based particle and W is the maximum width of the polymeric based particle. For example, the length to width ratio L/W of the majority of the polymeric based particles may be at least about 0.5, such as, at least about 0.8, at least about 1.0, at least about 1.3 or even at least about 1.5. According to still other embodiments, the length to width ratio L/W of the majority of the polymeric based particles may be not greater than about 3, such as, not greater than about 2.8, not greater than about 2.5, not greater than about 2.3 or even not greater than about 2.0. It will be appreciated that the length to width ratio L/W of the majority of polymeric based particles may be any value between any of the minimum and maximum values noted above. It will be further appreciated that the length to width ratio L/W of the majority of polymeric based particles may be within a range between any of the minimum and maximum values noted above.

It will also be appreciated that at least a majority of the polymeric based particles having a particular length to width ratio L/W may be taken to indicate that at least about 50% of the polymeric based particles have a particular length to width ratio L/W as described herein. According to still other embodiments, it will be appreciated that a greater percentage of the polymeric based particles may have a particular length to width ratio L/W as described herein. For example, the percentage polymeric based particles having a particular length to width ratio L/W as described herein may be at least about 55%, such as, at least about 60%, at least about 65%, at least about 70%, at least about 75%, at least about 80%, at least about 85%, at least about 90% or even at least about 95%. It will be appreciated that the percentage of polymeric based particles having a particular length to width ratio L/W as described herein may be any value between any of values noted above. It will be further appreciated that the percentage of polymeric based particles having a particular length to width ratio L/W as described herein may be within a range between any of the values noted above.

Figure 3:
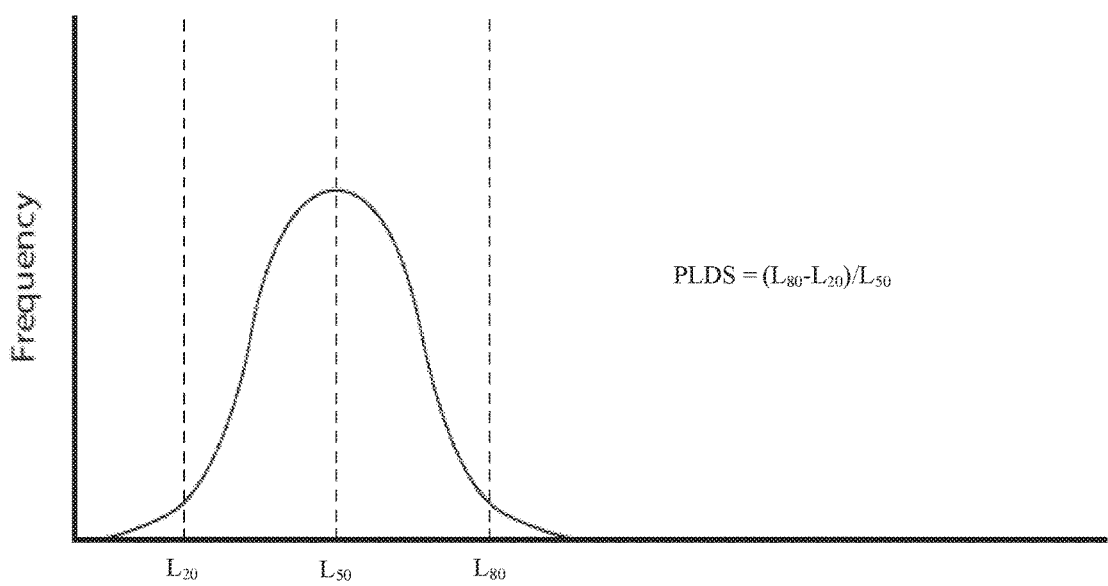
FIG. 3 includes graph representations illustrating a particle length distribution span for a plurality of polymeric based particles.

According to certain embodiments described herein, the plurality of polymeric based particles may be described as having a particular particle length distribution span PLDS. As shown in FIG. 3, the particle length distribution span PLDS of a plurality of polymeric based particles is equal to $(L_{80}-L_{20})/L_{50}$, where $L_{80}$ is equal to a $d_{80}$ particle length distribution measurement of the plurality of polymeric based particles. $L_{20}$ is equal to a $d_{20}$ particle length distribution measurement of the plurality of polymeric based particles and $L_{50}$ is equal to a $d_{50}$ particle length distribution measurement of the plurality of polymeric based particles. The plurality of polymeric based particles may have a PLDS of not greater than about 1.2, such as, not greater than about 1.1, not greater than about 1.0, not greater than about 0.90, not greater than about 0.80, not greater than about 0.70, not greater than about 0.60, not greater than about 0.50, not greater than about 0.40, not greater than about 0.30, not greater than about 0.20, not greater than about 0.10 or even not greater than about 0.05. According to another particular embodiment, the plurality of polymeric based particles may have a PLDS of at least about 0.01, such as, at least about 0.05, at least about 0.10, at least about 0.20, at least about 0.30, at least about 0.40, at least about 0.50, at least about 0.60 or even at least about 0.70. It will be appreciated that plurality of polymeric based particles may have a PLDS of any value between any of the minimum and maximum values noted above. It will be further appreciated that the plurality of polymeric based particles may have a PLDS of any value within a range between any of the minimum and maximum values noted above.

According to yet another embodiment, the plurality of polymeric based particles may be described as having a single modal particle length distribution.

According to still other embodiments, the plurality of polymeric based particles may have a particular $d_{50}$ particle length distribution measurement $L_{50}$. For example, the $L_{50}$ of the plurality of polymer based particles may be at least about 15 microns, such as, at least about 20 microns, at least about 25 microns, at least about 30 microns, at least about 35 microns, at least about 40 microns, at least about 45 microns or even at least about 50 microns. According to yet other embodiments, the $L_{50}$ of the plurality of polymer based particles may be not greater than about 110 microns, such as, not greater than about 105 microns, not greater than about 100 microns, not greater than about 95 microns, not greater than about 90 microns, not greater than about 85 microns, not greater than about 80 microns, not greater than about 75 microns or even not greater than about 70 microns. It will be appreciated that plurality of polymeric based particles may have a $L_{50}$ of any value between any of the minimum and maximum values noted above. It will be further appreciated that the plurality of polymeric based particles may have a $L_{50}$ of any value within a range between any of the minimum and maximum values noted above.

According to still other embodiments, the plurality of polymeric based particles may have a particular $d_{20}$ particle length distribution measurement $L_{20}$. For example, the $L_{20}$ of the plurality of polymer based particles may be at least about 5 microns, such as, at least about 10 microns, at least about 15 microns, at least about 20 microns, at least about 25 microns, at least about 30 microns, at least about 35 microns or even at least about 40 microns. According to yet other embodiments, the $L_{20}$ of the plurality of polymer based particles may be not greater than about 80 microns, such as, not greater than about 75 microns, not greater than about 70 microns, not greater than about 65 microns, not greater than about 60 microns, not greater than about 55 microns or even not greater than about 50 microns. It will be appreciated that plurality of polymeric based particles may have a $L_{20}$ of any value between any of the minimum and maximum values noted above. It will be further appreciated that the plurality of polymeric based particles may have a $L_{20}$ of any value within a range between any of the minimum and maximum values noted above.

According to still other embodiments, the plurality of polymeric based particles may have a particular do particle length distribution measurement $L_{80}$. For example, the $L_{80}$ of the plurality of polymer based particles may be at least about 40 microns, such as, at least about 45 microns, at least about 50 microns, at least about 55 microns, at least about 60 microns, at least about 65 microns or even at least about 70 microns. According to yet other embodiments, the $L_{80}$ of the plurality of polymer based particles may be not greater than about 130 microns, such as, not greater than about 125 microns, not greater than about 120 microns, not greater than about 115 microns, not greater than about 110 microns, not greater than about 105 microns or even not greater than about 100 microns. It will be appreciated that plurality of polymeric based particles may have a $L_{80}$ of any value between any of the minimum and maximum values noted above. It will be further appreciated that the plurality of polymeric based particles may have a $L_{80}$ of any value within a range between any of the minimum and maximum values noted above.

According to a particular embodiment, the plurality of polymeric based particles may be formed from a single chemical component. According to still other embodiments, the plurality of polymeric based particles may be formed from multiple chemical components. According to yet other embodiments, a majority of polymeric based particles may be formed from a single chemical component. According to yet other embodiments, a majority of the polymeric based particles may be formed from multiple chemical components. According to still other embodiments, a majority of the polymeric based particle may have a homogeneous composition.

It will also be appreciated that at least a majority of the polymeric based particles having a particular chemical composition as described herein may be taken to indicate that at least about 50% of the polymeric based particles have the particular chemical composition as described herein. According to still other embodiments, it will be appreciated that a greater percentage of the polymeric based particles may have the particular chemical composition as described herein. For example, the percentage polymeric based particles having a particular chemical composition as described herein may be at least about 55%, such as, at least about 60%, at least about 65%, at least about 70%, at least about 75%, at least about 80%, at least about 85%, at least about 90% or even at least about 95%. It will be appreciated that the percentage of polymeric based particles having a particular chemical composition as described herein may be any value between any of values noted above. It will be further appreciated that the percentage of polymeric based particles having a particular chemical composition as described herein may be within a range between any of the values noted above.

According to yet other embodiments, the plurality of polymeric based particles may be formed from a semi-crystalline base polymer, such as, polyamides, polyethylenes, polypropylenes, polyetheretherketones, polyoxymethylene acetals, polytetrafluoroethylenes, polypheneylene sulfides, polybutylene terephthalates or combinations thereof. According to still other embodiments, the plurality of polymeric based particles may be formed from aliphatic nylon polyamides, nylon 6, nylon 6-6, nylon 6-10, nylon 6-12, nylon 10, nylon 10-10, nylon 11, nylon 12 or combinations thereof. According to yet another embodiment, the plurality of polymeric based particles may be formed from a low-density polyethylene, medium-density polyethylene, high density polyethylene or combinations thereof.

According to yet other embodiments, the plurality of polymeric based particles may include a semi-crystalline base polymer, such as, polyamides, polyethylenes, polypropylenes, polyetheretherketones, polyoxymethylene acetals, polytetrafluoroethylenes, polypheneylene sulfides, polybutylene terephthalates or combinations thereof. According to still other embodiments, the plurality of polymeric based particles may include aliphatic nylon polyamides, nylon 6, nylon 6-6, nylon 6-10, nylon 6-12, nylon 10, nylon 10-10, nylon 11, nylon 12 or combinations thereof. According to yet another embodiment, the plurality of polymeric based particles may include a low-density polyethylene, medium-density polyethylene, high density polyethylene or combinations thereof.

According to yet other embodiments, the plurality of polymeric based particles may consist of a semi-crystalline base polymer, such as, polyamides, polyethylenes, polypropylenes, polyetheretherketones, polyoxymethylene acetals, polytetrafluoroethylenes, polypheneylene sulfides, polybutylene terephthalates or combinations thereof. According to still other embodiments, the plurality of polymeric based particles may consist of aliphatic nylon polyamides, nylon 6, nylon 6-6, nylon 6-10, nylon 6-12, nylon 10, nylon 10-10, nylon 11, nylon 12 or combinations thereof. According to yet another embodiment, the plurality of polymeric based particles may consist of a low-density polyethylene, medium-density polyethylene, high density polyethylene or combinations thereof.

According to yet other embodiments, the plurality of polymeric based particles may be formed from an amorphous material base polymer, such as, poly(methyl methacrylate), polystyrene, acrylonitrile butadiene styrene, polylactic acid, polybenzimidazole, polycarbonate, polysulfone, amorphous polyamide.

According to yet other embodiments, the plurality of polymeric based particles may include an amorphous material base polymer, such as, poly(methyl methacrylate), polystyrene, acrylonitrile butadiene styrene, polylactic acid, polybenzimidazole, polycarbonate, polysulfone, amorphous polyamide.

According to yet other embodiments, the plurality of polymeric based particles may consist of an amorphous material base polymer, such as, poly(methyl methacrylate), polystyrene, acrylonitrile butadiene styrene, polylactic acid, polybenzimidazole, polycarbonate, polysulfone, amorphous polyamide.

According to yet other embodiments, each polymeric based particle of the plurality of polymeric based particles may be formed from a semi-crystalline base polymer, such as, polyamides, polyethylenes, polypropylenes, polyetheretherketones, polyoxymethylene acetals, polytetrafluoroethylenes, polypheneylene sulfides, polybutylene terephthalates or combinations thereof. According to still other embodiments, the plurality of polymeric based particles may be formed from aliphatic nylon polyamides, nylon 6, nylon 6-6, nylon 6-10, nylon 6-12, nylon 10, nylon 10-10, nylon 11, nylon 12 or combinations thereof. According to yet another embodiment, each polymeric based particle of the plurality of polymeric based particles may be formed from a low-density polyethylene, medium-density polyethylene, high density polyethylene or combinations thereof.

According to yet other embodiments, each polymeric based particle of the plurality of polymeric based particles may include a semi-crystalline base polymer, such as, polyamides, polyethylenes, polypropylenes, polyetheretherketones, polyoxymethylene acetals, polytetrafluoroethylenes, polypheneylene sulfides, polybutylene terephthalates or combinations thereof. According to still other embodiments, each polymeric based particle of the plurality of polymeric based particles may include aliphatic nylon polyamides, nylon 6, nylon 6-6, nylon 6-10, nylon 6-12, nylon 10, nylon 10-10, nylon 11, nylon 12 or combinations thereof. According to yet another embodiment, each polymeric based particle of the plurality of polymeric based particles may include a low-density polyethylene, medium-density polyethylene, high density polyethylene or combinations thereof.

According to yet other embodiments, each polymeric based particle of the plurality of polymeric based particles may consist of a semi-crystalline base polymer, such as, polyamides, polyethylenes, polypropylenes, polyetheretherketones, polyoxymethylene acetals, polytetrafluoroethylenes, polypheneylene sulfides, polybutylene terephthalates or combinations thereof. According to still other embodiments, each polymeric based particle of the plurality of polymeric based particles may consist of aliphatic nylon polyamides, nylon 6, nylon 6-6, nylon 6-10, nylon 6-12, nylon 10, nylon 10-10, nylon 11, nylon 12 or combinations thereof. According to yet another embodiment, each polymeric based particle of the plurality of polymeric based particles may consist of a low-density polyethylene, medium-density polyethylene, high density polyethylene or combinations thereof.

According to yet other embodiments, each polymeric based particle of the plurality of polymeric based particles may be formed from an amorphous material base polymer, such as, poly(methyl methacrylate), polystyrene, acrylonitrile butadiene styrene, polylactic acid, polybenzimidazole, polycarbonate, polysulfone, amorphous polyamide.

According to yet other embodiments, each polymeric based particle of the plurality of polymeric based particles may include an amorphous material base polymer, such as, poly(methyl methacrylate), polystyrene, acrylonitrile butadiene styrene, polylactic acid, polybenzimidazole, polycarbonate, polysulfone, amorphous polyamide.

According to yet other embodiments, each polymeric based particle of the plurality of polymeric based particles may consist of an amorphous material base polymer, such as, poly(methyl methacrylate), polystyrene, acrylonitrile butadiene styrene, polylactic acid, polybenzimidazole, polycarbonate, polysulfone, amorphous polyamide.

Referring back to the method of forming a consumable powder mixture, the method may further include wet processing the plurality of polymeric based particles.

According to particular embodiments, wet processing the plurality of polymeric based particles may include sifting the plurality of polymeric based particles. Sifting the plurality of polymeric based particles may be accomplished using any desirable sifting method.

According to yet other embodiments, wet processing may further include removing any processing aides added to the polymeric based fibers, polymeric based yarns, polymeric based tow or aggregated polymeric based tows. According to certain embodiments, removing the processing aides may include washing the plurality of polymeric based particles.

According to still other embodiments, wet processing may further include introducing additional additives to the plurality of polymeric based particles to improve the processing properties of the powder, slow thermal. UV or other types of polymer degradation, change the optical properties of the powder, introduce improvements in fire resistance, or change electrical or other measureable properties of the powder.

According to still other embodiments, wet processing may further include introducing additional fillers to the plurality of polymeric based particles to improve the processing properties of the powder, slow thermal, UV or other types of polymer degradation, change the optical properties of the powder, introduce improvements in fire resistance, or change electrical or other measureable properties of the powder.

According to yet other embodiments, wet processing may further include performing a particular pre-shrink treatment. For example, applying a particular pre-shrink treatment may include a phenol pre-shrink the plurality of polymeric based particles. According to still other embodiments, applying a particular pre-shrink treatment may include applying an alcohol pre-shrink treatment. According to still other embodiments, applying a particular pre-shrink treatment may include applying another treatment to pre-shrink the plurality of polymeric based particles.

According to still other embodiments, applying a particular pre-shrink treatment may include heating a wet bath of the plurality of polymeric based particles. According to yet other embodiments, applying a particular pre-shrink treatment may include boiling a wet bath of the plurality of polymeric based particles. According to still other embodiments, applying a particular pre-shrink treatment may include using a wet bath that may include water, oil, soaps, acid or bases, perfumes or lubricants.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Embodiment 1

A consumable polymeric based powder mixture, the mixture comprising a plurality of polymeric based particles having a unitary construction, wherein at least about 80% of the plurality of polymeric based particles have a generally cylindrical shape.

Embodiment 2

A consumable polymeric based powder mixture, the mixture comprising a plurality of polymeric based particles, wherein at least about 80% of the plurality of polymeric based particles have a generally cylindrical shape and wherein the plurality of polymeric based particles have a particle length distribution span (PLDS) of not greater than about 1.2, where PLDS is equal to $(L_{80}-L_{20})/L_{50}$.

Embodiment 3

The consumable polymeric based powder mixture of any one of the previous embodiments, wherein at least a majority of the plurality of polymeric based particles comprises a generally planar face orthogonal to a longitudinal axis of the generally cylindrical shape.

Embodiment 4

The consumable polymeric based powder mixture of any one of the previous embodiments, wherein at least a majority of the plurality of polymeric based particles comprises at least one internal cross-section orthogonal to the longitudinal axis of the generally cylindrical shape.

Embodiment 5

The consumable polymeric based powder mixture of any one of the previous embodiments, wherein the at least one cross-section has a maximum width of not greater than about 100 microns, such as, not greater than about 90 microns, not greater than about 80 microns, not greater than about 70 microns, not greater than about 60 microns, not greater than about 50 microns, not greater than about 40 microns or not greater than about 30 microns.

Embodiment 6

The consumable polymeric based powder mixture of any one of the previous embodiments, wherein the at least one cross-section has a maximum width of at least about 1 micron, at least about 5 microns, at least about 10 microns or at least about 15 microns.

Embodiment 7

The consumable polymeric based powder mixture of any one of the previous embodiments, wherein at least about 85% of the plurality of polymeric based particles have a generally cylindrical shape, at least about 90% or at least about 95%.

Embodiment 8

The consumable polymeric based powder mixture of any one of the previous embodiments, wherein at least about 80% of the plurality of polymeric based particles comprise a cut artifact on a base of the polymeric based particles, at least about 85%, at least about 90% or at least about 95%.

Embodiment 9

The consumable polymeric based powder mixture of any one of the previous embodiments, wherein at least a majority of the plurality of polymeric based particles has a homogeneous composition.

Embodiment 10

The consumable polymeric based powder mixture of any one of the previous embodiments, wherein at least a majority of the plurality of polymeric based particles comprise a length to width ratio L/W of at least about 0.5, at least about 0.8, at least about 1.0, at least about 1.3 or at least about 1.5.

Embodiment 11

The consumable polymeric based powder mixture of any one of the previous embodiments, wherein at least a majority of the plurality of polymeric based particles comprise a length to diameter ratio L/W of not greater than about 3, not greater than about 2.8, not greater than about 2.5, not greater than about 2.3 or not greater than about 2.0.

Embodiment 12

The consumable polymeric based powder mixture of any one of the previous embodiments, wherein at least a majority of the plurality of polymeric based particles have a length not greater than about 250 microns, not greater than about 240 microns, not greater than about 230 microns, not greater than about 220 microns, not greater than about 210 microns, not greater than about 200 microns, not greater than about 190 microns, not greater than about 180 microns, not greater than about 170 microns, not greater than about 160 microns or not greater than about 150 microns.

Embodiment 13

The consumable polymeric based powder mixture of any one of the previous embodiments, wherein at least a majority of the plurality of polymeric based particles have an average length of at least about 30 microns, at least about 40 microns or at least about 50 microns.

Embodiment 14

The consumable polymeric based powder mixture of any one of the previous embodiments, wherein the plurality of polymeric based particles have an average length of not greater than about 225 microns, not greater than about 200 microns, not greater than about 175 microns, not greater than about 150 microns, not greater than about 125 microns, not greater than about 100 microns, not greater than about 90 microns, not greater than about 80 micron or not greater than about 70 microns.

Embodiment 15

The consumable polymeric based powder mixture of any one of the previous embodiments, wherein at least a majority of the plurality of polymeric based particles have an average length of at least about 30 microns, at least about 40 microns or at least about 50 microns.

Embodiment 16

The consumable polymeric based powder mixture of any one of the previous embodiments, wherein the plurality of polymeric based particles comprises a semi-crystalline base polymer, polyamides, polyethylenes, polypropylenes, polyetheretherketones, polyoxymethylene acetals, polytetrafluoroethylenes, polypheneylene sulfides, polybutylene terephthalates, block-copolymers thereof or combinations thereof.

Embodiment 17

The consumable polymeric based powder mixture of any one of the previous embodiments, wherein the plurality of polymeric based particles comprise aliphatic nylon polyamides, nylon 6, nylon 6-6, nylon 6-10, nylon 6-12, nylon 10, nylon 10-10, nylon 11, nylon 12, block-copolymers thereof or combinations thereof.

Embodiment 18

The consumable polymeric based powder mixture of any one of the previous embodiments, wherein the plurality of polymeric based particles comprises low-density polyethylene, medium-density polyethylene, high density polyethylene, block-copolymers thereof or combinations thereof.

Embodiment 19

The consumable polymeric based powder mixture of any one of the previous embodiments, wherein the plurality of polymeric based particles comprises isotactic polypropylenes, syndiotactic polypropylenes, branched and linear variations thereof, block-copolymers thereof or combinations thereof.

Embodiment 20

The consumable polymeric based powder mixture of any one of the previous embodiments, wherein the plurality of polymeric based particles comprises an amorphous material, poly(methyl methacrylate), polystyrene, acrylonitrile butadiene styrene, polylactic acid, polybenzimidazole, polycarbonate, polysulfone, amorphous polyamide, block-copolymers thereof or combinations thereof.

Embodiment 21

The consumable polymeric based powder mixture of any one of the previous embodiments, wherein the plurality of polymeric based particles comprises a single modal length distribution.

Embodiment 22

The consumable polymeric based powder mixture of any one of the previous embodiments, wherein the plurality of polymeric based particles comprises a particle length distribution span (PLDS) of not greater than about 1.15, where PLDS is equal to $(L_{80}-L_{20})/L_{50}$, not greater than about 1.1, not greater than about 1.05, not greater than about 1.0, not greater than about 0.95, not greater than about 0.90, not greater than about 0.85, not greater than about 0.80, not greater than about 0.75, not greater than about 0.70, not greater than about 0.65, not greater than about 0.60, not greater than about 0.55, not greater than about 0.50, not greater than about 0.45, not greater than about 0.40, not greater than about 0.35, not greater than about 0.30, not greater than about 0.25, not greater than about 0.20, not greater than about 0.15, not greater than about 0.10 or not greater than about 0.05.

Embodiment 23

The consumable polymeric based powder mixture of any one of the previous embodiments, wherein the plurality of polymeric based particles comprises at least about 50% of polymeric based particles having a $L_{50}$ in a range of from about 15 microns to about 110 microns.

Embodiment 24

The consumable polymeric based powder mixture of any one of the previous embodiments, wherein the plurality of polymeric based particles comprises a $L_{50}$ of at least about 15 microns.

Embodiment 25

The consumable polymeric based powder mixture of any one of the previous embodiments, wherein the plurality of polymeric based particles comprises a $L_{50}$ of not greater than about 110 microns.

Embodiment 26

The consumable polymeric based powder mixture of any one of the previous embodiments, wherein the plurality of polymeric based particles comprises a $L_{20}$ of at least about 5 microns.

Embodiment 27

The consumable polymeric based powder mixture of any one of the previous embodiments, wherein the plurality of polymeric based particles comprises a $L_{20}$ of not greater than about 80 microns.

Embodiment 28

The consumable polymeric based powder mixture of any one of the previous embodiments, wherein the plurality of polymeric based particles comprises a $L_{80}$ of at least about 40 microns.

Embodiment 29

The consumable polymeric based powder mixture of any one of the previous embodiments, wherein the plurality of polymeric based particles comprises a $L_{80}$ of not greater than about 130.

Embodiment 30

A method of forming a consumable polymeric based powder mixture polymeric based, the method comprising: providing a plurality of polymeric based tows comprising a plurality of polymeric based fibers; aggregating the plurality of polymeric based tows into an aggregated polymeric based tow; and successively forming a plurality of polymeric based particles from the aggregated polymeric based tow, wherein the average length of the plurality of polymeric based particles is less than about 250 microns.

Embodiment 31

A method of forming a consumable polymeric based powder mixture, the method comprising: providing a plurality of polymeric based tows comprising a plurality of polymeric based fibers; aggregating the plurality of polymeric based tows into an aggregated polymeric based tow; and successively forming a plurality of polymeric based particles from the aggregated polymeric based tow, wherein at least a majority of the polymeric based particles of the plurality of polymeric based particles has a unitary construction and wherein at least about 80% of the plurality of polymeric based particles have a generally cylindrical shape.

Embodiment 32

A method of forming a consumable polymeric based powder mixture, the method comprising: providing a plurality of polymeric based tows comprising a plurality of polymeric based fibers; aggregating the plurality of polymeric based tows into an aggregated polymeric based tow; and successively forming a plurality of polymeric based particles from the aggregated polymeric based tow, wherein at least about 80% of the plurality of polymeric based particles have a generally cylindrical shape and wherein the plurality of polymeric based particles have a particle length distribution span (PLDS) of not greater than about 1.2, where PLDS is equal to $(L_{80}-L_{20})/L_{50}$.

Embodiment 33

A method of forming a consumable polymeric based powder mixture, the method comprising: providing a plurality of polymeric based tows comprising a plurality of polymeric based fibers; aggregating the plurality of polymeric based tows into an aggregated polymeric based tow; successively forming a plurality of polymeric based particles from the aggregated polymeric based tow; and wet processing the plurality of polymeric based particles, wherein at least about 80% of the plurality of polymeric based particles have a generally cylindrical shape.

Embodiment 34

The method of any one of the previous embodiments, wherein successively forming a plurality of polymer based particles comprises cutting the aggregated polymeric based tow to form the plurality of polymer based particles.

Embodiment 35

The method of any one of the previous embodiments, wherein successively cutting the aggregated polymeric based tow forms at least about 25,000 distinct particles in each cut.

Embodiment 36

The method of any one of the previous embodiments, wherein successively cutting the aggregated polymeric based tow occurs with a periodicity of at least about 100 cuts per minute.

Embodiment 37

The method of any one of the previous embodiments, wherein the plurality of tows comprises at least 2 tows, at least 5 tows, at least 10 tows, at least 15 tows, or even at least 20 tows.

Embodiment 38

The method of any one of the previous embodiments, wherein the method further comprises compressing the aggregated polymeric based tow before and/or during successively forming the plurality of polymer based particles.

Embodiment 39

The method of any one of the previous embodiments, wherein at least a majority of the plurality of polymeric based particles comprises a generally planar face orthogonal to a longitudinal axis of the generally cylindrical shape.

Embodiment 40

The method of any one of the previous embodiments, wherein at least a majority of the plurality of polymeric based particles comprises at least one internal cross-section orthogonal to the longitudinal axis of the generally cylindrical shape.

Embodiment 41

The method of any one of the previous embodiments, wherein the at least one cross-section has a maximum width of not greater than about 100 microns, such as, not greater than about 90 microns, not greater than about 80 microns, not greater than about 70 microns, not greater than about 60 microns, not greater than about 50 microns, not greater than about 40 microns or not greater than about 30 microns.

Embodiment 42

The method of any one of the previous embodiments, wherein the at least one cross-section has a maximum width of at least about 1 micron, at least about 5 microns, at least about 10 microns or at least about 15 microns.

Embodiment 43

The method of any one of the previous embodiments, wherein at least about 85% of the plurality of polymeric based particles have a generally cylindrical shape, at least about 90% or at least about 95%.

Embodiment 44

The method of any one of the previous embodiments, wherein at least about 80% of the plurality of polymeric based particles comprise a cut artifact on a base of the polymeric based particles, at least about 85%, at least about 90% or at least about 95%.

Embodiment 45

The method of any one of the previous embodiments, wherein at least a majority of the plurality of polymeric based particles have a homogeneous composition.

Embodiment 46

The method of any one of the previous embodiments, wherein at least a majority of the plurality of polymeric based particles comprise a length to width ratio L/W of at least about 0.5, at least about 0.8, at least about 1.0, at least about 1.3 or at least about 1.5.

Embodiment 47

The method of any one of the previous embodiments, wherein at least a majority of the plurality of polymeric based particles comprise a length to diameter ratio L/W of not greater than about 3, not greater than about 2.8, not greater than about 2.5, not greater than about 2.3 or not greater than about 2.0.

Embodiment 48

The method of any one of the previous embodiments, wherein at least a majority of the plurality of polymeric based particles have a length not greater than about 250 microns, not greater than about 240 microns, not greater than about 230 microns, not greater than about 220 microns, not greater than about 210 microns, not greater than about 200 microns, not greater than about 190 microns, not greater than about 180 microns, not greater than about 170 microns, not greater than about 160 microns or not greater than about 150 microns.

Embodiment 49

The method of any one of the previous embodiments, wherein at least a majority of the plurality of polymeric based particles have an average length of at least about 15 microns, at least about 20 microns, at least about 25 microns, at least about 30 microns, at least about 40 microns or at least about 50 microns.

Embodiment 50

The method of any one of the previous embodiments, wherein the plurality of polymeric based particles have an average length of not greater than about 225 microns, not greater than about 200 microns, not greater than about 175 microns, not greater than about 150 microns, not greater than about 125 microns, not greater than about 100 microns, not greater than about 90 microns, not greater than about 80 micron or not greater than about 70 microns.

Embodiment 51

The method of any one of the previous embodiments, wherein at least a majority of the plurality of polymeric based particles have an average length of at least about 15 microns, at least about 20 microns, at least about 25 microns, at least about 30 microns, at least about 40 microns or at least about 50 microns.

Embodiment 52

The method of any one of the previous embodiments, wherein the plurality of polymeric based particles comprises a semi-crystalline base polymer, polyamides, polyethylenes, polypropylenes, polyetheretherketones, polyoxymethylene acetals, polytetrafluoroethylenes, polypheneylene sulfides, polybutylene terephthalates, block-copolymers thereof or combinations thereof.

Embodiment 53

The method of any one of the previous embodiments, wherein the plurality of polymeric based particles comprise aliphatic nylon polyamides, nylon 6, nylon 6-6, nylon 6-10, nylon 6-12, nylon 10, nylon 10-10, nylon 11, nylon 12, block-copolymers thereof or combinations thereof.

Embodiment 54

The method of any one of the previous embodiments, wherein the plurality of polymeric based particles comprises low-density polyethylene, medium-density polyethylene, high density polyethylene, block-copolymers thereof or combinations thereof.

Embodiment 55

The method of any one of the previous embodiments, wherein the plurality of polymeric based particles comprises isotactic polypropylenes, syndiotactic polypropylenes, branched and linear variations thereof, block-copolymers thereof or combinations thereof.

Embodiment 56

The method of any one of the previous embodiments, wherein the plurality of polymeric based particles comprises an amorphous material, poly(methyl methacrylate), polystyrene, acrylonitrile butadiene styrene, polylactic acid, polybenzimidazole, polycarbonate, polysulfone, amorphous polyamide, block-copolymers thereof or combinations thereof.

Embodiment 57

The method of any one of the previous embodiments, wherein the plurality of polymeric based particles comprises a single modal length distribution.

Embodiment 58

The method of any one of the previous embodiments, wherein the plurality of polymeric based particles comprises a particle length distribution span (PLDS) of not greater than about 1.15, where PLDS is equal to $(L_{80}-L_{20})/L_{50}$, not greater than about 1.1, not greater than about 1.05, not greater than about 1.0, not greater than about 0.95, not greater than about 0.90, not greater than about 0.85, not greater than about 0.80, not greater than about 0.75, not greater than about 0.70, not greater than about 0.65, not greater than about 0.60, not greater than about 0.55, not greater than about 0.50, not greater than about 0.45, not greater than about 0.40, not greater than about 0.35, not greater than about 0.30, not greater than about 0.25, not greater than about 0.20, not greater than about 0.15, not greater than about 0.10 or not greater than about 0.05.

Embodiment 59

The method of any one of the previous embodiments, wherein the plurality of polymeric based particles comprises at least about 50% of polymeric based particles having a $L_{50}$ in a range of from about 15 microns to about 110 microns.

Embodiment 60

The method of any one of the previous embodiments, wherein the plurality of polymeric based particles comprises a $L_{50}$ of at least about 15 microns.

Embodiment 61

The method of any one of the previous embodiments, wherein the plurality of polymeric based particles comprises a $L_{50}$ of not greater than about 110 microns.

Embodiment 62

The method of any one of the previous embodiments, wherein the plurality of polymeric based particles comprises a $L_{20}$ of at least about 5 microns.

Embodiment 63

The method of any one of the previous embodiments, wherein the plurality of polymeric based particles comprises a $L_{20}$ of not greater than about 80 microns.

Embodiment 64

The method of any one of the previous embodiments, wherein the plurality of polymeric based particles comprises a $L_{80}$ of at least about 40 microns.

Embodiment 65

The method of any one of the previous embodiments, wherein the plurality of polymeric based particles comprises a $L_{80}$ of not greater than about 130 microns.

Embodiment 66

The method of any one of the previous embodiments, wherein the method further comprises sifting the plurality of polymeric based particles.

Embodiment 67

The method of any one of the previous embodiments, wherein wet processing further comprises removing any processing aides added to the prior to forming the plurality of polymeric based particles.

Embodiment 68

The method of any one of the previous embodiments, wherein wet processing further comprises introducing additional additives to the plurality of polymeric based particles to improve the processing properties of the powder, the mechanical properties of the powder, slow thermal, UV or other types of polymer degradation, change the optical properties of the powder, introduce improvements in fire resistance, or change electrical or other measureable properties of the powder.

Embodiment 69

The method of any one of the previous embodiments, wherein wet processing further comprises introducing additional fillers to the plurality of polymeric based particles to improve the processing properties of the powder, the mechanical properties of the powder, slow thermal. UV or other types of polymer degradation, change the optical properties of the powder, introduce improvements in fire resistance, or change electrical or other measureable properties of the powder.

Embodiment 70

The method of any one of the previous embodiments, wherein wet processing comprises washing the plurality of polymeric based particles.

Embodiment 71

The method of any one of the previous embodiments, wherein wet processing comprises a phenol, alcohol or other treatment to pre-shrink the plurality of polymeric based particles.

Embodiment 72

The method of any one of the previous embodiments, wherein pre-shrinking of the plurality of polymeric based particles comprises heating a wet bath of the plurality of polymeric based particles.

Embodiment 73

The method of any one of the previous embodiments, wherein pre-shrinking of the plurality of polymeric based particles comprises boiling a wet bath of the plurality of polymeric based particles.

Embodiment 74

The method of any one of the previous embodiments, wherein the wet bath comprises water, oil, soaps, acid or bases, perfumes or lubricants.

EXAMPLES

The concepts described herein will be further described in the following Examples, which do not limit the scope of the invention described in the claims.

Example 1

A first sample consumable polymeric powder S1 was formed according to embodiments described herein. As summarized in Table 1 below, powder size characteristics were measured including cut-length, diameter and aspect ratio (L/W).

TABLE 1

Powder Size Characteristics

| Measurements | Cut-Length (microns) | Diameter (microns) | Aspect Ratio |
|---|---|---|---|
| Mean | 56.4 | 57.1 | 0.968 |
| Median | 58.7 | 57.6 | 0.959 |
| Maximum | 87.2 | 66.4 | 1.297 |
| Minimum | 30.2 | 48.8 | 0.621 |

Figure 4:
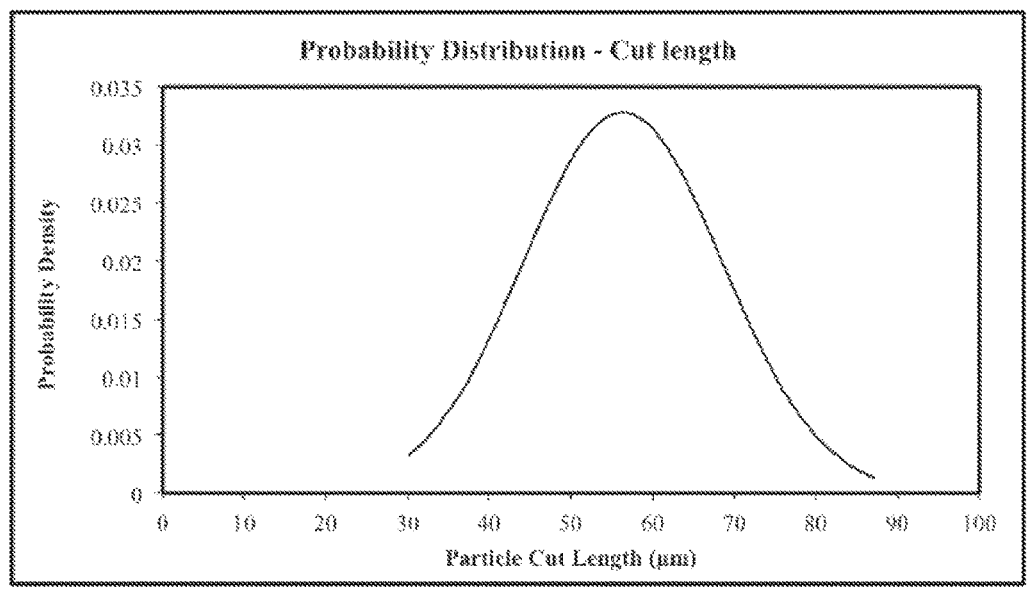
FIG. 4 illustrates a plot of particle cut-length versus probability density showing the cut length probability distribution of the sample consumable polymeric powder formed according to one embodiment of the present disclosure.

FIG. 4 illustrates a plot of particle cut-length versus probability density showing the cut length probability distribution of the first sample consumable polymeric powder S1.

Figure 5:
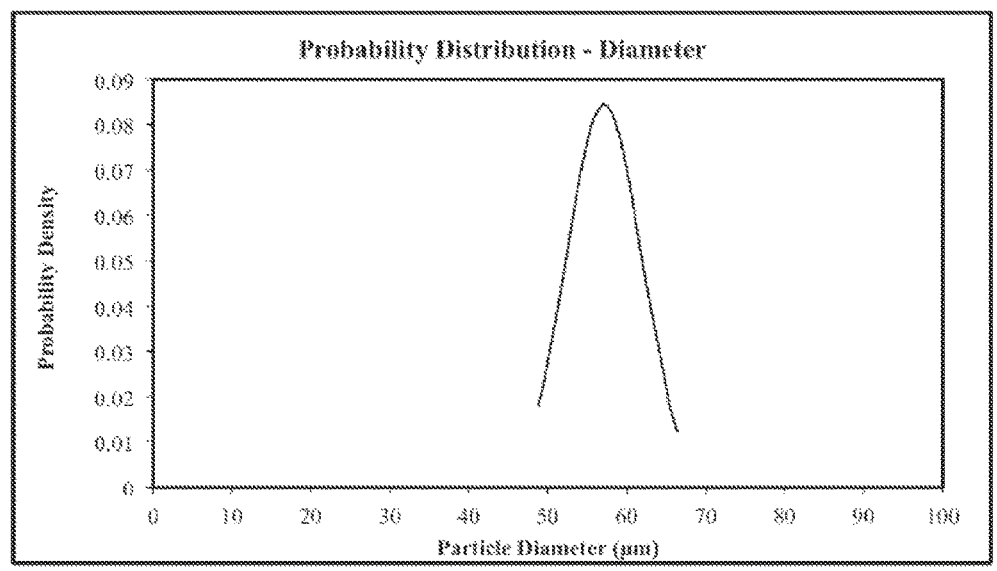
FIG. 5 illustrates a plot of particle diameter versus probability density showing the diameter probability distribution of the sample consumable polymeric powder formed according to one embodiment of the present disclosure.

FIG. 5 illustrates a plot of particle diameter versus probability density showing the diameter probability distribution of the first sample consumable polymeric powder S1.

Figure 6:
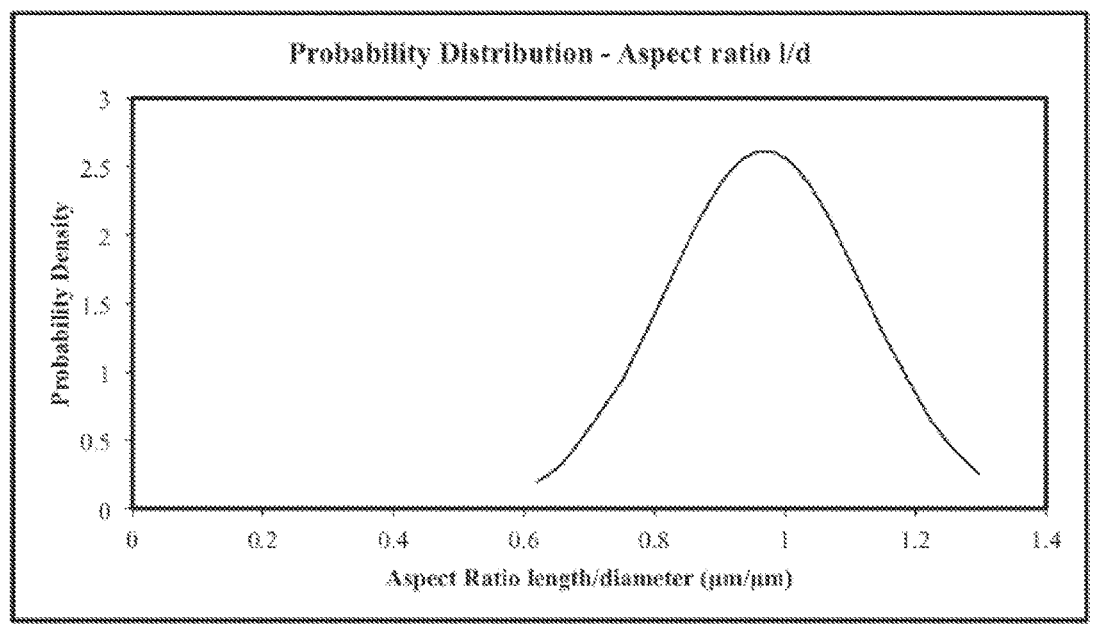
FIG. 6 illustrates a plot of particle aspect ratio versus probability density showing the aspect ratio probability distribution of the sample consumable polymeric powder formed according to one embodiment of the present disclosure.

FIG. 6 illustrates a plot of particle aspect ratio versus probability density showing the aspect ratio probability distribution of the first sample consumable polymeric powder.

Example 2

A second sample consumable polymeric powder S2 was formed according to embodiments described herein and measured to determine the powder's particle length distribution span (PLDS). The $L_{50}$ for the sample consumable polymeric powder was calculated as 55.9 microns. The $L_{20}$ for the sample consumable polymeric powder was calculated as 45.4 microns. The $L_{80}$ for the sample consumable polymeric powder was calculated as 67.3 microns. The PLDS for the second sample consumable polymeric powder S2 was equal to 0.385 (i.e. ((67.3−45.4)/55.9)).

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A consumable polymeric based powder mixture, the mixture comprising a plurality of polymeric based particles having a unitary construction, wherein at least about 80% of the plurality of polymeric based particles have a generally cylindrical shape.

2. A consumable polymeric based powder mixture, the mixture comprising a plurality of polymeric based particles, wherein at least about 80% of the plurality of polymeric based particles have a generally cylindrical shape and wherein the plurality of polymeric based particles have a particle length distribution span (PLDS) of not greater than about 1.2, where PLDS is equal to $(L_{80}-L_{20})/L_{50}$.

3. The consumable polymeric based powder mixture of claim 1, wherein the at least one cross-section has a maximum width of not greater than about 100 microns.

4. The consumable polymeric based powder mixture of claim 1, wherein at least about 80% of the plurality of polymeric based particles comprise a cut artifact on a base of the polymeric based particles.

5. The consumable polymeric based powder mixture of claim 1, wherein at least a majority of the plurality of polymeric based particles has a homogeneous composition.

6. The consumable polymeric based powder mixture of claim 1, wherein at least a majority of the plurality of polymeric based particles have a length not greater than about 250 microns.

7. The consumable polymeric based powder mixture of claim 1, wherein the plurality of polymeric based particles have an average length of not greater than about 225 microns.

8. A method of forming a consumable polymeric based powder mixture, the method comprising:
   providing a plurality of polymeric based tows comprising a plurality of polymeric based fibers;
   aggregating the plurality of polymeric based tows into an aggregated polymeric based tow; and
   successively forming a plurality of polymeric based particles from the aggregated polymeric based tow,
   wherein at least a majority of the polymeric based particles of the plurality of polymeric based particles has a unitary construction and wherein at least about 80% of the plurality of polymeric based particles have a generally cylindrical shape.

9. The method of claim 8, wherein successively forming a plurality of polymer based particles comprises cutting the aggregated polymeric based tow to form the plurality of polymer based particles.

10. The method of claim 8, wherein the method further comprises compressing the aggregated polymeric based tow before or during successively forming the plurality of polymer based particles.

11. The method of claim 8, wherein the method further comprises sifting the plurality of polymeric based particles.

12. The method of claim 8, wherein the method further comprises wet processing the plurality of polymeric based particles.

13. The method of claim 12, wherein wet processing further comprises removing any processing aides added to the prior to forming the plurality of polymeric based particles.

14. The method of claim 12, wherein wet processing further comprises introducing additional additives to the plurality of polymeric based particles to improve the processing properties of the powder, the mechanical properties of the powder, slow thermal, UV or other types of polymer degradation, change the optical properties of the powder, introduce improvements in fire resistance, or change electrical or other measureable properties of the powder.

15. The method of claim 12, wherein wet processing comprises a phenol, alcohol or other treatment to pre-shrink the plurality of polymeric based particles.

16. The consumable polymeric based powder mixture of claim 2, wherein the at least one cross-section has a maximum width of not greater than about 100 microns.

17. The consumable polymeric based powder mixture of claim 2, wherein at least about 80% of the plurality of polymeric based particles comprise a cut artifact on a base of the polymeric based particles.

18. The consumable polymeric based powder mixture of claim 2, wherein at least a majority of the plurality of polymeric based particles has a homogeneous composition.

19. The consumable polymeric based powder mixture of claim 2, wherein at least a majority of the plurality of polymeric based particles have a length not greater than about 250 microns.

20. The consumable polymeric based powder mixture of claim 2, wherein the plurality of polymeric based particles have an average length of not greater than about 225 microns.

* * * * *

UNITED STATES PATENT AND TRADEMARK OFFICE
CERTIFICATE OF CORRECTION

PATENT NO. : 10,307,935 B2
APPLICATION NO. : 15/576374
DATED : June 4, 2019
INVENTOR(S) : Vikram Devaraj et al.

Page 1 of 1

It is certified that error appears in the above-identified patent and that said Letters Patent is hereby corrected as shown below:

In the Claims

Column 27, Lines 28 and 29, please delete "added to the".

Signed and Sealed this
Eighth Day of October, 2019

Andrei Iancu
*Director of the United States Patent and Trademark Office*